A. J. HOBBS & J. R. JEWELL.
HORSE CHECKING DEVICE.
APPLICATION FILED MAY 20, 1908.
935,625.
Patented Sept. 28, 1909.
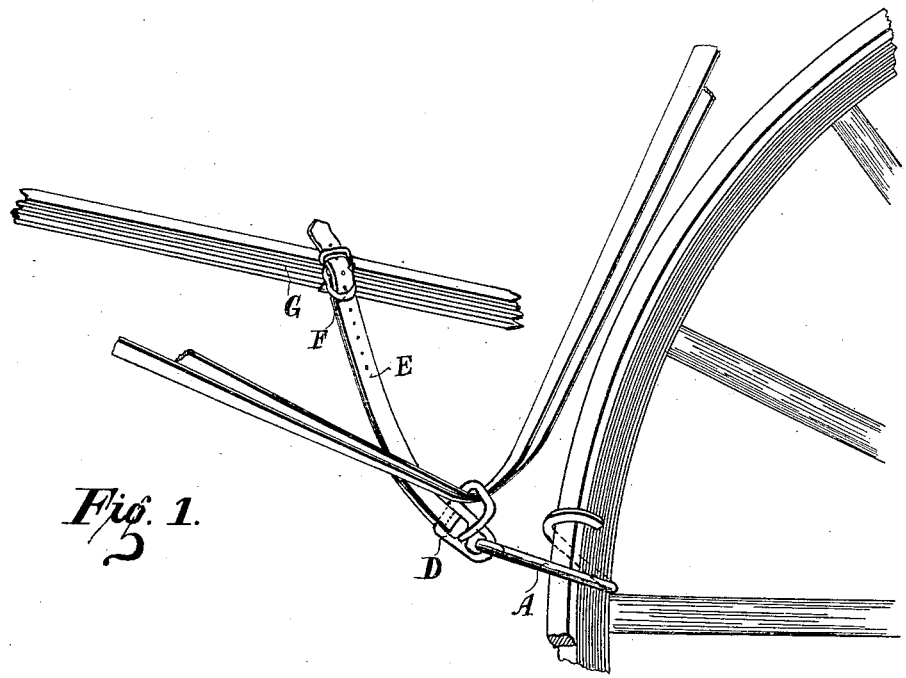
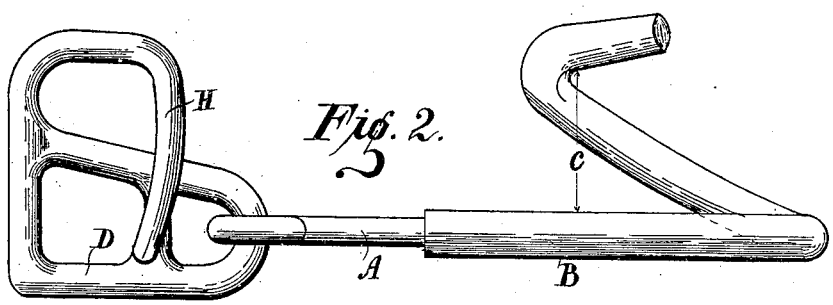
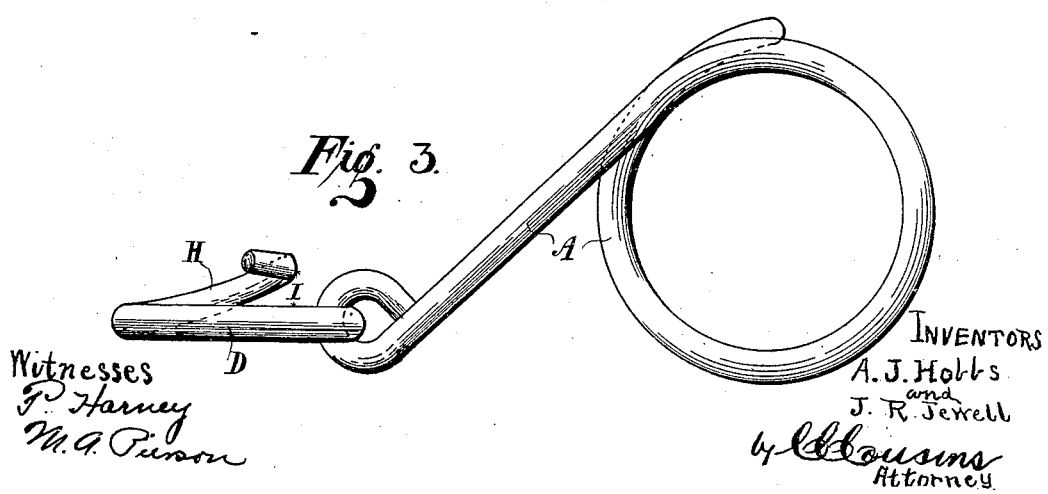
Witnesses
T. Harney
M. G. Pinson
INVENTORS
A. J. Hobbs
and
J. R. Jewell
by C. Cousins
Attorney

UNITED STATES PATENT OFFICE.

ALFRED JAMES HOBBS, OF EAST BRUNSWICK, AND JAMES ROBERTS JEWELL, OF BRUNSWICK, VICTORIA, AUSTRALIA.

HORSE-CHECKING DEVICE.

935,625.  Specification of Letters Patent.  Patented Sept. 28, 1909.

Application filed May 20, 1908. Serial No. 433,833.

*To all whom it may concern:*

Be it known that we, ALFRED JAMES HOBBS and JAMES ROBERTS JEWELL, citizens of the Commonwealth of Australia, and residing at 28 Deakin street, East Brunswick, and 119 Lygon street, Brunswick, Victoria, Australia, have invented an Improved Horse-Checking Device, of which the following is a specification.

Hitherto with the check straps and other devices that have been employed on buggies, tradesmen's carts and other vehicles, time has been lost in fastening the check strap around the rim of the wheel and unfastening it therefrom and with some arrangements of check reins, if the horse backed, the reins were continuously being tightened and consequently there was a tendency for the horse to run back more than he would otherwise do.

This invention has been devised in order to provide an exceedingly simple and inexpensive contrivance which can readily be attached to, or detached from, the rim of the wheel of a buggy or other road vehicle, and which will operate upon the reins in the event of the vehicle being drawn forward, thereby automatically checking the horse but will not have any effect, other than to lock the wheel, if the horse starts to back.

In order that the invention may be readily understood it will be described by reference to the accompanying drawings, in which :—

Figure 1 is a perspective view illustrating the application of the invention to the wheel of a buggy or other road vehicle. Fig. 2 is a side elevation, and Fig. 3 is a plan (with the covering leather removed) of the contrivance forming the subject-matter of this application.

The same letters of reference indicate the same or corresponding parts in all the figures.

In carrying this invention into practice, a hook A of peculiar construction is provided for the purpose of being readily engaged with, or disengaged from, the rim of a buggy or other wheel. This hook is made somewhat in the form of a spiral as shown. It consists of a stout piece of steel or other suitable material which may be covered with leather as indicated at B to prevent it injuring the paint or woodwork of the wheel. Sufficient distance is left between the turns of the spiral as indicated at C in Fig. 2 to enable the hook to be passed on either side of the rim of the wheel and then be turned up into the position indicated in Fig. 1 so that it will completely encircle said rim. This spiral hook A is pivotally connected to an iron or other ring D to which is attached a strap E fitted with a buckle or other suitable fastening device F whereby it may be attached to the shaft G or other convenient part of the vehicle.

The ring D is formed with a curved arm or retaining hook H projecting laterally from the inner side of the ring D and curved back over the face of same as shown in the drawings. Sufficient space is left between this arm or guard H and the ring D as indicated at I in Fig. 3 to enable the reins to be passed into engagement therewith as indicated in Fig. 1.

Instead of passing the reins themselves into engagement with the ring D or with the arm thereon, check reins may be attached to the ordinary reins and can be permanently in engagement with said ring, the free ends of the check reins being attached or secured to the splash board, bracket or other convenient part of the vehicle.

With this invention only one hand is required for the purpose of engaging or disengaging the hook A from the rim of the wheel and the reins can similarly be engaged or disengaged from the ring D in an equally convenient and expeditious manner. This is a great convenience to milkmen, tradesmen and others who require to leave their carts unattended in the street as it enables them to lock the wheel, and the reins, without loss of time and without interfering with any basket or package which they may be carrying in their other hand, there being no buckle or other similar fastening which requires the use of both hands for manipulating same.

What we do claim as our invention and desire to secure by Letters Patent is:—

1. In a horse checking device a hook bent in the form of a spiral, in combination with a ring having a projecting arm arranged to engage the reins of a harness.

2. In a horse checking device, a hook bent in the form of a spiral, in combination with a ring pivotally connected with the hook and provided with integral rein engaging means, and means for securing the ring to a part of a vehicle.

3. In a horse checking device, an integral hook arranged to be clipped on the felly of a vehicle, a ring pivotally connected with the hook and provided with an integral rein engaging arm, and a flexible member having one end engaged with the ring and its opposite end provided with a securing means.

In witness whereof we have hereunto set our hands in the presence of two witnesses.

ALFRED JAMES HOBBS.
JAMES ROBERTS JEWELL.

Witnesses:
J. DOUGLAS BIRRELL,
ANNIE EDWARDS.